United States Patent
Sloane et al.

(10) Patent No.: US 11,271,919 B2
(45) Date of Patent: Mar. 8, 2022

(54) NETWORK SECURITY SYSTEM FOR ROGUE DEVICES

(71) Applicant: BANK OF AMERICA CORPORATION, Charlotte, NC (US)

(72) Inventors: Brandon Sloane, Santa Barbara, CA (US); Regina Yee Cadavid, San Gabriel, CA (US); Gloria Joo, Moorpark, CA (US); Jinyoung Nathan Kim, Charlotte, NC (US); Nia Mack, Addison, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 149 days.

(21) Appl. No.: 16/890,564

(22) Filed: Jun. 2, 2020

(65) Prior Publication Data

US 2021/0377237 A1 Dec. 2, 2021

(51) Int. Cl.
G06F 7/04 (2006.01)
G06F 15/16 (2006.01)
H04L 29/06 (2006.01)
H04L 9/32 (2006.01)

(52) U.S. Cl.
CPC ............ H04L 63/08 (2013.01); H04L 9/3242 (2013.01); H04L 63/04 (2013.01); H04L 63/06 (2013.01)

(58) Field of Classification Search
USPC .......................................................... 726/7
See application file for complete search history.

(56) References Cited

U.S. PATENT DOCUMENTS

| 6,275,587 | B1 | 8/2001 | Amerige |
| 7,328,457 | B1 | 2/2008 | Mister |
| 7,512,986 | B2 | 3/2009 | Shen-Orr et al. |
| 7,813,506 | B2 | 10/2010 | Moskowitz et al. |
| 7,920,702 | B2 | 4/2011 | Shen-Orr et al. |
| 8,046,841 | B2 | 10/2011 | Moskowitz et al. |
| 8,160,249 | B2 | 4/2012 | Moskowitz et al. |

(Continued)

OTHER PUBLICATIONS

Ronald L. Rivest. "Chaffing and Winnowing: Confidentiality without Encryption." MIT Lab for Computer Science. Mar. 18, 1998 (rev. Jul. 1, 1998). http://people.csail.mit.edu/rivest/chaffing-980701.txt.

(Continued)

Primary Examiner — Jeffrey C Pwu
Assistant Examiner — Samuel Ambaye
(74) Attorney, Agent, or Firm — Moore & Van Allen PLLC; Jeffrey R. Gray

(57) ABSTRACT

A security system that provides for secure communication between systems on a network without the need for encrypting the packets related to the communication, and thus, provides secure communications over the network without the processing capacity, memory, and/or processing delays caused by encryption of the packets. The disclosure aids in preventing rogue systems from being able to read communications over the network without the need for encryption. The packets for the communications are sent over the network in clear text, which are readable by any systems on the network, however, only the systems that are authorized are able to determine what packets are the correct packets and what packets are the imitation packets.

20 Claims, 3 Drawing Sheets

(56) References Cited

U.S. PATENT DOCUMENTS

| | | |
|---|---|---|
| 8,272,051 B1 | 9/2012 | Zhao et al. |
| 8,351,605 B2 | 1/2013 | Bandholz et al. |
| 8,391,485 B2 | 3/2013 | Bandholz, Sr. et al. |
| 8,578,480 B2 | 11/2013 | Judge et al. |
| 10,305,689 B2 | 5/2019 | Araki |
| 2007/0245417 A1 | 10/2007 | Lee et al. |
| 2011/0066910 A1* | 3/2011 | Bandholz .............. H04L 1/1867 714/748 |
| 2012/0331553 A1* | 12/2012 | Aziz .................... G06F 21/554 726/23 |
| 2014/0023193 A1* | 1/2014 | Landheer ............ H04L 63/1441 380/268 |

OTHER PUBLICATIONS https://en.wikipedia.org/wiki/Chaffing_and_winnowing.

* cited by examiner

110 A SENDING SYSTEM UTILIZES A PLURALITY OF PACKETS FOR A COMMUNICATION (E.G., CREATED BY AN AGENT, A SECURITY SYSTEM, OTHER SYSTEM ON THE NETWORK), WHEREIN THE PLURALITY OF PACKETS COMPRISE ONE OR MORE WHEAT PACKETS AND ONE OR MORE CHAFF PACKETS (E.G., ONE OR MORE CHAFF PACKETS COMPRISE IMITATION PACKETS OR PAST OR CURRENT WHEAT PACKETS UNRELATED TO THE COMMUNICATION BEING SENT)

120 THE SENDING SYSTEM ATTACHES A WHEAT SIGNATURE TO EACH OF THE WHEAT PACKETS (E.G., THE SIGNATURE MAY BE CREATED USING A PRE-SHARED KEY AND ALGORITHM, AND/OR AT LEAST A PORTION OF THE WHEAT PACKET)

130 THE CHAFF PACKETS INCLUDE A CHAFF SIGNATURE (E.G., THE CHAFF SIGNATURE MAY BE AN IMITATION SIGNATURE OR MAY BE A MODIFIED WHEAT SIGNATURE FROM A DIFFERENT COMMUNICATION)

140 A RECEIVING SYSTEM RECEIVES THE PLURALITY OF PACKETS FOR THE COMMUNICATION AND DETERMINES A VALIDATED SIGNATURE FOR EACH OF THE PLURALITY OF PACKETS (E.G., REPLICATES A RECEIVED SIGNATURE FROM EACH OF THE PLURALITY OF PACKETS)

150 WHEN THE VALIDATED SIGNATURE MEETS THE RECEIVED SIGNATURE THE PACKETS ARE IDENTIFIED AS WHEAT PACKETS (E.G., THE PRE-SHARED KEY AND ALGORITHM AND/OR A PORTION OF THE PACKET RESULTS IN THE SAME SIGNATURE AS THE RECEIVED SIGNATURE)

160 WHEN THE VALIDATED SIGNATURE FAILS TO MEET THE RECEIVED SIGNATURE THE PACKETS ARE CHAFF PACKETS AND DISCARDED (E.G., THE PRE-SHARED KEY AND ALGORITHM AND/OR A PORTION OF THE PACKET RESULTS IN A DIFFERENT SIGNATURE AS THE RECEIVED SIGNATURE)

170 THE ONE OR MORE WHEAT PACKETS ARE ASSEMBLED, IF NECESSARY, INTO THE COMMUNICATION (E.G., THE WHEAT PACKETS MAY BE ASSEMBLED USING THE PRE-SHARED KEY, THE ALGORITHM, A PORTION OF THE PACKETS THEMSELVES, AND/OR ANOTHER FEATURE)

180 ANY ROGUE SYSTEMS ACCESSING THE NETWORK WOULD BE UNABLE TO DETERMINE THE WHEAT PACKETS FROM THE CHAFF PACKETS WITHOUT THE PRE-SHARED KEY AND THE ALGORITHM

NETWORK SECURITY SYSTEM FOR ROGUE DEVICES

FIELD

The present invention relates to a security system, and more particularly to a security system that allows for secure communications between systems on the network without encrypting the communication and while preventing rogue systems from determining the communication.

BACKGROUND

In order to send secure communications, typical communications are encrypted utilizing a session key. Only the parties with the session key are able to read the communications. Should any party have access to the session key, the party can review the communication that was encrypted using the session key.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for a security system that provides for secure communication between systems on a network without the need for encrypting the packets related to the communication, and thus, provides secure communications over the network without the processing capacity, memory, and/or processing delays caused by encryption of the packets. The invention aids in preventing rogue systems from being able to read communications over the network without the need for encryption. The packets for the communications are sent over the network in clear text, which are readable by any systems on the network; however, only the systems that are authorized are able to determine what packets are the correct packets and what packets are the imitation packets.

Embodiments of the invention comprise systems, computer-implemented methods, and computer program products for providing secure communications between a plurality of computer systems over a network. Embodiments of the invention comprise a sending system on the network, with one or more processing devices, that is configured to execute computer readable code to create a plurality of packets for a communication. The plurality of packets comprise one or more wheat packets and one or more chaff packets. Embodiments of the invention comprise a receiving system on the network that receives the plurality of packets for the communication. The receiving system is configured to determine a validated signature for each of the plurality of packets. The receiving system identifies the one or more chaff packets when the validated signature determined for each of plurality of packets fails to meet a respective chaff signature for each of the plurality of packets, and discards the one or more chaff packets. The receiving system further identifies the one or more wheat packets when the validated signature determined for each of the plurality of packets meet a respective wheat signature for each of the plurality of packets. The system determines the communication from the sending system based on the one or more wheat packets. Embodiments of the invention aid in preventing a rogue system from determining the communication from the sending system without identifying the one or more wheat packets or the one or more chaff packets from the plurality of packets. In this way, embodiments of the present invention allow for secure communication between systems without having to use encryption of the content within the packets.

In further accord with embodiments of the invention, determining the validated signature comprises replicating a received signature for each of the plurality of packets, wherein the received signature comprises the chaff signature on each of the one or more chaff packets or the wheat signature on each of the one or more wheat packets.

In other embodiments of the invention, the received signature comprises a message authentication code (MAC), and wherein replicating the MAC comprises using a key and an algorithm to create the validated signature.

In yet other embodiments of the invention, the key is a pre-shared key that is shared with each of the plurality of computer systems that are authorized to access the network.

In still other embodiments of the invention, the algorithm is a pre-shared algorithm that is shared with each of the plurality of computer systems that are authorized to access the network.

In other embodiments of the invention, the replicating the received signature further comprises using at least a portion of the plurality of packets to create the validated signature.

In further accord with embodiments of the invention, the portion of the plurality of packets comprises a serial number for each of the plurality of packets.

In other embodiments of the invention, the portion of the plurality of packets comprise content from each of the plurality of packets.

In yet other embodiments of the invention, the sending system creates the wheat signature for the one or more wheat packets.

In still other embodiments of the invention, the wheat signature is created from a key, an algorithm, and a portion of a wheat packet of the one or more wheat packets.

In other embodiments of the invention, the sending system creates the one or more chaff packets using imitation content and imitation signatures.

In further accord with embodiments of the invention, the one or more chaff packets appear to be related to a legitimate communication.

In other embodiments of the invention, the sending system creates the one or more chaff packets using content and an unrelated validated signature from one or more unrelated legitimate communications.

In yet other embodiments of the invention, the unrelated validated signature is altered before sending each of the one or more chaff packets.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
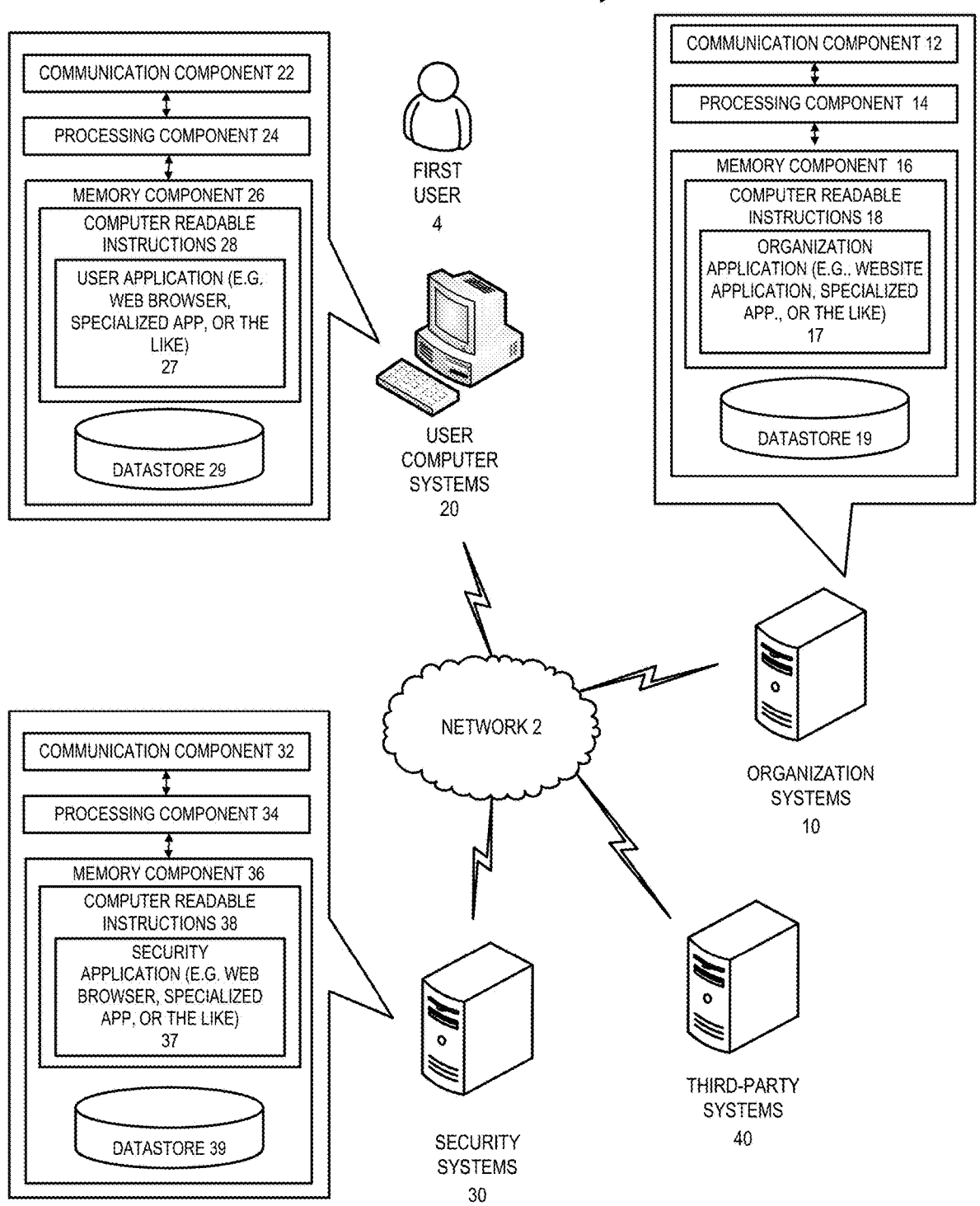

Having thus described embodiments of the invention in general terms, reference will now be made to the accompanying drawings, and wherein:

FIG. 1 illustrates a block system diagram of a network security system, in accordance with some embodiments of the present disclosure.

Figure 2:
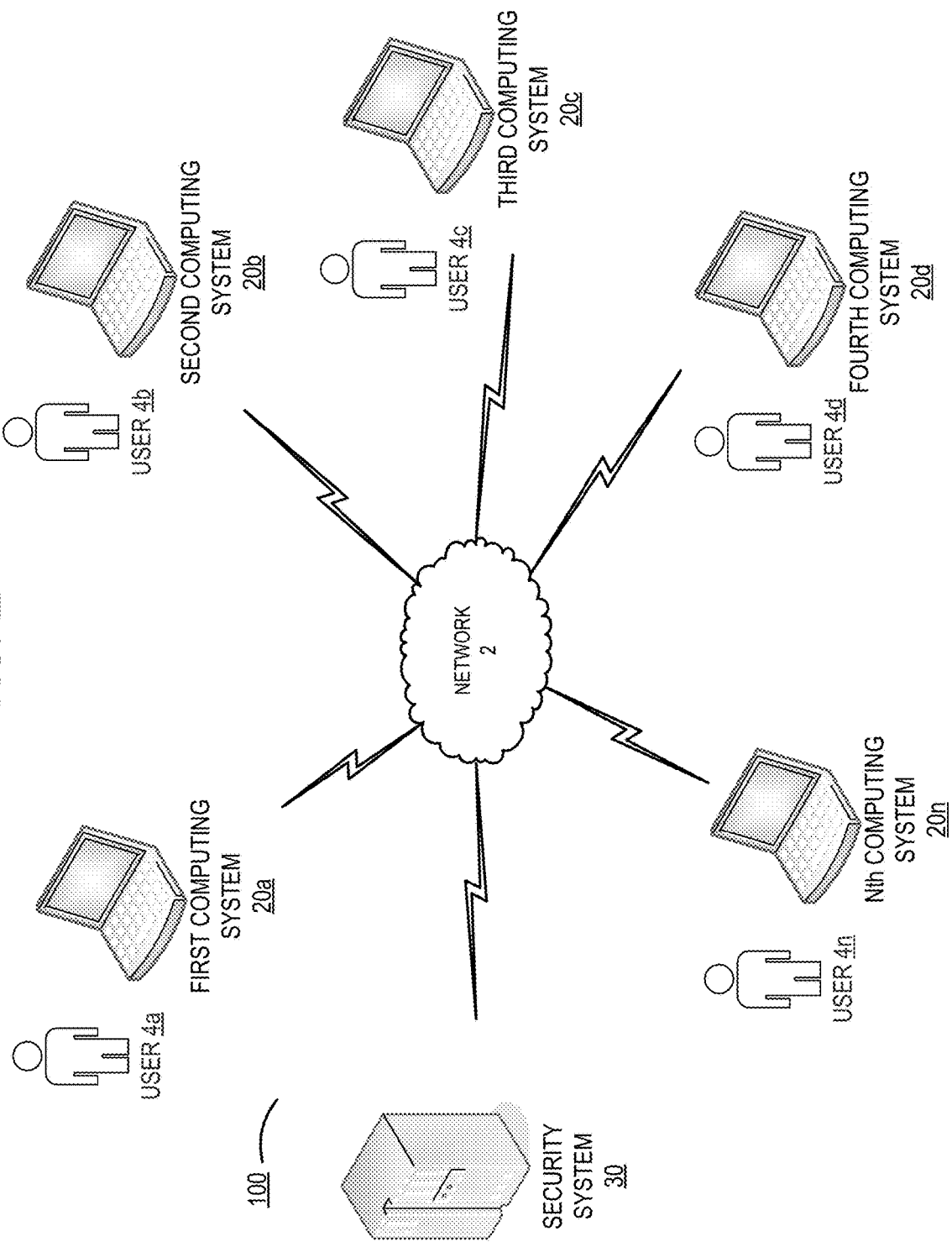

FIG. 2 illustrates a network environment for providing secure communications without encryption over the network, in accordance with some embodiments of the present disclosure.

FIG. 3 illustrates a process flow for providing secure communications without encryption and preventing rogue systems from accessing the communications, in accordance with some embodiments of the present disclosure.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are described herein for a security system that provides for secure communication between systems on a network without the need for encrypting the packets related to the communication, and thus, provides secure communications over the network without the processing capacity, memory, and/or processing delays caused by encryption of the packets. The invention aids in preventing rogue systems from being able to read communications over the network without the need for encryption. The packets for the communications are sent over the network in clear text, which are readable by any systems on the network, however, only the systems that are authorized are able to determine what packets are the correct packets and what packets are the imitation packets.

FIG. 1 illustrates a network security system environment 1, in accordance with embodiments of the present disclosure. As illustrated in FIG. 1, one or more organization systems 10 are operatively coupled, via a network 2, to one or more user computer systems 20, one or more security systems 30, one or more third-party systems 40, and/or one or more other systems (not illustrated). In this way, the security systems 30 (in coordination with the user computer systems 20 and/or other systems on the network) may be utilized to create secure communications over the network 2 without the need to encrypt all or a majority of the communications between the systems on the network 2. As will be described herein, the security systems 30 and/or other systems described herein may utilize security signatures (e.g., keys, MACs, algorithms, and/or the like) attached to packets to allow a receiving system to identify the valid packets for a communication. For example, the security systems 30 and/or other systems (e.g., user computer systems 20) may create and/or assign one or more keys (e.g., pre-shared keys, such a global network keys, content keys, segmentation keys, or the like) and one or more algorithms (e.g., pre-shared algorithm, or the like). The one or more keys and the one or more algorithms may be utilized to create message authentication codes (MACs) for each of the packets being sent, in particular, wheat packets, as will be discussed herein. Moreover, chaff packets (e.g., unrelated real packets, imitation packets, combinations thereof, or the like) and wheat packets (e.g., real packets, or the like) may be used when sending communications. Any receiving system must be able to identify the security signature in order to determine what packets are wheat packets to determine the communication and what packets are chaff packets that should be discarded. For example, each receiving system may have the key (e.g., pre-shared key) and the one or more algorithms in order to determine what MAC attached to a packet is valid, and thus, identify what packets are wheat packets and what are chaff packets that can be discarded (e.g., a technique that may be described as winnowing). The wheat packets can then be identified as the legitimate communication. In addition, the communication may be broken up into a plurality of wheat packets before the security signature is added, and as such, the receiving system may also have to reassemble the plurality of wheat packets together in order to identify the communications. While security is achieved through keys, algorithms, splitting packets, or the like, the messages themselves are sent over the network 2 without any encryption, as will be described in further detail herein.

The communications that may utilize the embodiments of the present disclosure, may include any type of communication such as, but not limited to, communication related to a computer system trying to access a network, communications between segmented computer systems within a network trying to communicate with other computer systems within the same segment, computer systems trying to communication with systems on other networks, or the like. The communications may relate to interactions, accessing data, running applications, sending messages, or the like, as will be discussed in further detail herein.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components may include functionality to operate one or more software programs based on computer-readable instructions thereof, which may be stored in the one or more memory components.

The one or more processing components 14 use the one or more communication components 12 to communicate with the network 2 and other components on the network 2, such as, but not limited to, the components of the one or more user computer systems 20, the one or more security systems 30, the one or more third-party systems 40, and/or the one or more other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors, or the like.

As further illustrated in FIG. 1, the one or more organization systems 10 comprise computer-readable instructions 18 stored in the one or more memory components 16, which in some embodiments includes the computer-readable instructions 18 of the one or more organization applications 17 (e.g., secure website application, secure dedicated application, or the like). In some embodiments, the one or more memory components 16 include one or more data stores 19 for storing data related to the one or more organization systems 10, including, but not limited to, data created, accessed, and/or used by the one or more organization applications 17. The organization may be an entity that administers, controls, or regulates the network 2, user computer systems 20, the security systems 30, and/or the third-party systems 40. It should be understood that the users 4, third-parties, and organizations may all be referred to herein as entities.

As illustrated in FIG. 1, users 4 may communicate with each other over the network 2 as will be described in further detail herein. In some embodiments the security system 30 may be used to secure the communications over the network 2 and/or in some embodiments each of the systems on the network 2 may include a portion of the security systems 30 and/or application 37 thereof, such as an agent that may communicate with each of the computer systems or be located, at least partially (or entirely), on each of the computer systems 20. It should be understood that the user 4 may be a user that is communicating with other users on the network 4 through the use of the user computer systems 20. The user 4 may be representing himself/herself in a communication, a user 4 representing a third-party in an interaction, a user 4 that acts on behalf of the organization, a user 4 that acts on behalf of the security system 30, and/or the like. Consequently, the one or more users 4 may be individual users and/or employees, agents, representatives, officers, or the like of any entity on the network 2. In particular embodiments, the network 2 may be a network of an organization (e.g., a business) and the users 4 are the employees, agents, officers, or the like of the business.

As such, the user computer systems 20 may communicate with each other, the one or more organization systems 10, the one or more security systems 30, the one or more third-party systems 40, and/or other systems (not illustrated). The one or more user computer systems 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the one or more organization systems 10, the one or more security systems 30, the one or more third-party systems 40, and/or the other systems (not illustrated). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the one or more user computer systems 20 may have computer-readable instructions 28 stored in the one or more memory components 26, which in some embodiments includes the computer-readable instructions 28 for user applications 27, such as dedicated applications (e.g., apps, applet, or the like), portions of dedicated applications, a web browser or other apps that allow access to applications located on other systems, or the like. In some embodiments, the one or more memory components 26 include one or more data stores 29 for storing data related to the one or more user computer systems 20, including, but not limited to, data created, accessed, and/or used by the one or more user computer systems 20. The user application 27 may use the applications of the one or more organization systems 10, the one or more security systems 30, the one or more third-party systems 40, and/or one or more other systems (not illustrated) in order to communicate with other systems on the network and take various actions in a secure way without having to encrypt all or the majority of the communications over the network 2.

As illustrated in FIG. 1, one or more security systems 30 may be utilized by the one or more organization systems 10, the one or more user computer systems 20, the one or more third party systems 40, and/or other systems to aid in providing secure communications without requiring encryption of all or most of the communications. That is, the security system 30 may be utilized in order to create, store, manage or the like the keys (e.g., pre-shared keys, such as global keys, segmentation keys, specific communication keys, or the like) and/or the algorithms (e.g., MAC algorithms used to create the MACs), and/or communicate with the systems (e.g., the agents thereon, or the like) on the network 2 to facilitate the secure communications.

As such, the one or more security systems 30 are operatively coupled, via a network 2, to the one or more organization systems 10, the one or more user computer systems 20, the one or more third-party systems 40, and/or the other systems (not illustrated). The one or more security systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the one or more organization systems 10, the one or more user computer systems 20, the one or more third-party systems 40, and/or the one or more other systems (not illustrated). As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more security systems 30 may have computer-readable instructions 38 stored in the one or more memory components 36, which in one embodiment includes the computer-readable instructions 38 of one or more security applications 37. In some embodiments, the one or more memory components 36 include one or more data stores 39 for storing data related to the one or more security systems 30, including, but not limited to, data created, accessed, and/or used by the one or more security applications 37. The one or more security applications 37 may allow for creating, storing, managing, or the like of the keys (e.g., pre-shared keys, such as global keys, segmentation keys, communication keys, or the like) and/or the one or more algorithms (e.g., MAC algorithms, or the like), and/or communicate with the systems (e.g., the agents thereon, or the like) on the network 2 to facilitate the secure communications. In some embodiments, the one or more security systems 30 may be operated by the organization (e.g., be one of the one or more organization systems 10), or may be operated by a third-party on behalf of the organization.

Moreover, as illustrated in FIG. 1, the one or more third-party systems 40 are operatively coupled to the one or more organization systems 10, the one or more user computer systems 20, the one or more security systems 30, and/or the one or more other systems, through the network 2. The one or more third-party systems 40, and/or other like systems have components the same as or similar to the components described with respect to the one or more organization systems 10, the one or more user computer systems 20, and/or the one or more security systems 30 (e.g., one or more communication components, one or more processing components, and one or more memory devices with computer-readable instructions of one or more third-party applications, one or more datastores, or the like). Thus, the one or more third-party systems 40 communicate with the one or more organization systems 10, the one or more user computer systems 20, the one or more security systems 30, and/or each other in same or similar way as previously described with respect to the one or more organization systems 10, the one or more user computer systems 20, and/or the one or more security systems 30. The one or more third-party systems 40 may comprises the systems and applications that are trying to access the network 2 (e.g., as authorized parties, unauthorized parties, or the like). As such, in some embodiments the third-parties may be unauthorized third-parties that are trying to misappropriate communications between authorized systems on the network 2. In some embodiments, the third-parties are authorized to access the network 2 for various reasons (e.g., to perform maintenance, enter interactions, support the organization systems or the like). In still other embodiments, the third-parties may be external systems on external secure networks that aid in allowing authorized users 4 (e.g., users that are located outside of the network 2, such as out of the country) to access the network 2 from abroad.

The one or more other systems (not illustrated) may include the systems, and components thereof, for allowing communications between the systems (e.g., intermediaries that act as gateways, APIs, or the like to allow communication between the systems).

FIG. 2 illustrates a network environment 100 in which multiple entity computer systems (e.g., user computer systems 20), and entities (e.g., users 4) associated therewith, communicate with each other and other systems, including, but not limited to the security systems 30, the organization systems 10, or the like. The communications between the systems 20 may be secured communications, as will be described in further detail below. The network environment 200 may be any type of network 2, such as an internal network, external network, cross-organizational network, or any type of network of entity computer systems. In some embodiments the network may be a single network; however, in some embodiments while the network is a single network, it may have two or more segmented networks that may be regulated based on signatures (e.g., MAC that are created and identified using keys and/or algorithms) attached to packets. As such, even though a systems may be able to access the network 2, the system may not be able to communicate with other systems on the network (e.g., the system may not be able to create signatures that other systems can validate and/or the system may not be able to read signatures created by other systems on the network 2). As illustrated in FIG. 2, the network 2 may comprise a first entity computer system 20a, a second entity computer system 20b, a third entity computer system 20c, a fourth entity computer systems 20d, up to an $n^{th}$ entity computer system 20n. As further illustrated in Figures the computer systems 20a to $20n^{th}$ may correspond with entities, such as a first user 4a, a second user 4b, a third user 4c, a fourth user 4d, an nth user 4n, or the like. As will be discussed in further detail herein with respect the systems on the network 2, the systems may send and receive secure communications using wheat packets and chaff packets.

The present disclosure provides an improved way for sending communications between systems in secure way in order to restrict unauthorized third-party systems from accessing the network 2, and if they gain access to the system, to restrict such third-party systems from being able to intercept and identify the correct communication to misappropriate the communications. Furthermore, the present disclosure provides an improved way to allow for external users (e.g., travelers) to other countries operating outside of the network 2 (e.g., home network) to access the network 2 from an external unsecured network and to communicate with the systems on the network 2. In some embodiments, the users 4 operating on an unsecured network 3 may send communications through a remote secure network 5, which in addition to using wheat packets and chaff packets, may also obfuscate the routing of the packets and/or the IP addresses of the sending systems and the receiving systems. The present disclosure also allows for providing segmentation of the systems on the network 2 using different signatures (e.g., different keys and/or algorithms) to only allow sub-sets of the systems on the network 2 to communicate with each other.

The present invention utilizes and expands upon a chaffing communication technique that is utilized to provide confidential communication between systems on a network 2. Communication between systems may involve the sending systems creating and/or sending packets to the receiving system. The packets may comprise wheat packets (e.g., authorized packets, valid packets, or the like) and chaff packets (e.g., unauthorized packets, imitation packets, or the like), and the receiving system authenticates the signatures on the packets and separates the chaff packets from the wheat packets. The wheat packets may include the actual communication (e.g., message, process instructions, file, data, or the like) and/or portions thereof, while the chaff packets are the imitation communication and/or portions thereof.

The packets (e.g., wheat and chaff packets) are sent with authentication in form of a signature. The signature may be any type of secure signature that may be used to determine the packets that are wheat packets, how to assemble the wheat packets (if necessary), and/or what and/or how to use one or more keys and/or one or more algorithms (if necessary) in order to read the packets. For example, the signature may be an MAC that is created using a key (e.g., a pre-shared key), a MAC algorithm, and in some embodiments the packet itself (e.g., content of the communication, serial number of the wheat packets, both of the forgoing, and/or the like). For example, the key and at least a portion of the packet are inputs into the MAC algorithm, and the output of the MAC algorithm is the MAC that is attached to the wheat packet. The security system 30, and/or individual agents (e.g., pre-loaded applications, or portions thereof) that are located on each system, may be responsible for creating the wheat packets with the signature (e.g., authorized signature) and the chaff packets with an imitation signature, as will be described herein in further detail.

The receiving system may use the signature in order to determine what packets are wheat packets and what packets are chaff packets that can be discarded. For example, a receiving computer system receiving the packets (e.g., wheat packets, chaff packets, sub-portions thereof, or the like) may only be able to identify the correct communication using the key (e.g., pre-shared key) and/or a portion of the packet and the MAC algorithm. That is, the receiving system may try to recreate the MAC of a packet using the pre-shared key, the MAC algorithm and/or a portion of the packet (e.g., pre-agreed upon serial number, content section, or the like of the packet). If the comparison between the determined MAC recreated by the receiving party meets the MAC of the packet received by the receiving party then packet is determined to be a wheat packet. Alternatively, when the determined MAC of a packet recreated by the receiving system fails to meet the MAC of the packet received by the receiving system, the packet is a chaff packet and is discarded.

It should be understood that any entity on the system can read any packet (e.g., the packet is not encrypted, hidden, or the like); however, the receiving system can only identify the correct packets based on validating the signature attached to each packet (e.g., recreating the MAC signature).

As will be further described herein, in some embodiments of the invention, the chaff packets may be chaff packets generated (e.g., made up) by the sending computer systems or the security system 30. Alternatively, the chaff packets may be past or current wheat packets that were used for other communications outside of the present communication. By using unrelated wheat packets as the chaff packets, the systems are not required to generate chaff packets for the communications, which may reduce processing capacity and/or memory requirements, as well as increase processing speeds. The chaff packets may look like the wheat packets (e.g., correct format, have serial numbers, and have content, or the like), but the chaff packets have imitation signatures (e.g., MACs, or the like) that are not valid and cannot be recreated using the correct key and/or the correct algorithm (e.g., the pre-shared key and pre-shared algorithm).

In addition to sending chaff packets, the communications described herein may further include separating the packets (e.g., wheat and/or chaff packets) into multiple wheat packets (e.g., sub-wheat packets, or the like) which are each individually authenticated by adding the signature (e.g., MACs, or the like) to each of the sub-wheat packets. The separated sub-wheat packets may include serial numbers, which may function to both create the signature (e.g., the MACs), as well as allow the receiving system to reassemble the sub-wheat packets into the full wheat packet in the proper order. Consequently, the receiving system may use the signature of the multiple wheat packets (e.g., sub-wheat packets), as previously discussed herein, to identify the multiple wheat packets, remove the chaff packets with imitation signatures, and reassemble the multiple wheat packets (e.g., sub-wheat packets) into the full wheat packet in order to read the communication.

FIG. 3 illustrates a process flow for providing secure communications without encryption and preventing rogue systems from being able to read the communications. As previously discussed herein, in some embodiments each of the systems on the network 2 may have a pre-shared key. Additionally, each of the systems on the network 2 may also have a pre-shared algorithm or at least an indication to utilize a type of algorithm to create signatures for communications. In this way, in some embodiments a security system 30 or other system in the network may install an agent application 27 on each of the user computer systems 20 on the network 2. The agent may have the pre-shared key and pre-shared algorithm that it uses to create the packets, as will be described herein.

As illustrated in block 110 of FIG. 3, a sending system on the network 2 utilizes a plurality of packets for a communication with other systems on a network 2, such as a receiving system for the communication. The packets may contain the content of the communication, packet information (e.g., packet serial numbers, or the like), the system to which the packets are to be sent, or other like information. In some embodiments, the packets created for the communication are created by the sending system (e.g., agent application), the security system 30, by other systems and are captured by the sending system, and/or the like. The plurality of packets may comprise the one or more wheat packets and the one or more chaff packets, as previously described herein. The one or more wheat packets are the actual packets for the communication. As previously described herein, the wheat packets for a communication may be split up into a plurality of wheat packets (e.g., sub-wheat packets) in order to improve the security of the communication. The one or more chaff packets, as previously described herein, may comprise imitation packets that look like wheat packets, real packets for an unrelated communication (e.g., packets for a past or current unrelated communication on the network 2), or the like. When the agent application on the sending system creates the one or more chaff packets, the sending system may use a chaff packet algorithm (e.g., imitation packet generation, or the like). When the chaff packets are wheat packets from unrelated communications, the legitimate packets may be randomized (e.g., XORed, or the like with a log of network communications and/or salted using a pre-computed salt value, or the like).

Block 120 of FIG. 3 further illustrates that the sending system attaches a wheat signature to each of the one or more wheat packets. The wheat signature may be a signature that the receiving system can use to determine that the packet is a wheat packet, and thus, a valid packet for the communication. As previously described herein, the wheat signature may be created using the pre-shared key and a pre-shared algorithm. Additionally, the content of the wheat packet (e.g., the messages, a serial number of the wheat packet, or the like) may also be used by the pre-shared algorithm to create the signature in order to provide additional security. For example, the agent application on each system may use a pre-shared section (e.g., section of the content, serial number, or the like, or part thereof) of the packet to create and validate the signatures on the wheat packets. The signature created is attached to the wheat packet. In some embodiments, the pre-shared section may be dynamic as determined by each agent on each system (e.g., algorithm that determines what section of the packet to use to create the signature).

FIG. 3 further illustrates in block 130 that the one or more chaff signatures are attached to the one or more chaff packets. It should be understood that the chaff signatures may be imitation signatures that are similar to the wheat signatures (e.g., same length of characters, or the like) and are attached to the imitation chaff packets. Alternatively, the chaff signatures may comprise the original wheat signatures that have been modified (e.g., randomized by changing one or more characters) and are attached to the original wheat packets for other unrelated communications, which are now being used as chaff packets for the present communication.

Once the wheat packets and the chaff packets are created and/or identified from other sources, the wheat packets and the chaff packets are sent over the network 2 to one or more systems on the network 2, such as the receiving system. It should be understood, as will be described in further detail below with respect to block 180, that the wheat packets and chaff packets can be read by any system on the network 2 (e.g., authorized systems and unauthorized systems); however, only the systems on the network 2 that are authorized (e.g., have the pre-shared key, know the correct algorithm, and in some cases know the correct section of the packet used to create the signature) are able to determine what packets are the wheat packets and/or what packets are the chaff packets. As such, it should be understood that the one or more packets may include the plain text of the communication, which is available for any system on the network 2 to read. As illustrated by block 140 of FIG. 3, the receiving system receives the plurality of packets for the communication. The receiving system then determines a validated signature for each of the plurality of packets. That is, the receiving system replicates the signature attached to each of the plurality of packets by using the pre-shared key and algorithm and/or a section of the content of the packets in order to determine what the signature of the received packet should be.

Block 150 of FIG. 3 further illustrates that when the validated signature meets the received signature from the packets, the packets are identified as wheat packets. That is, for example, when the recreated signature determined by the receiving system meets the received signature included with the packet, the packet is identified as a wheat packet. Alternatively, as illustrated by block 160 in FIG. 3, when the validated signature fails to meet the received signature from the packets, the packets are identified as chaff packets. That is, for example, when the recreated signature determined by the receiving system fails to meet the received signature included with the packet, the packet is identified as a chaff packet. When the packets are identified by the receiving system as chaff packets, the chaff packets are discarded by the receiving system.

Block 170 of FIG. 3 illustrates that the receiving system reads the one or more wheat packets to determine the communication. In some embodiments when a plurality of wheat packets (e.g. sub-wheat packets) are identified, the receiving system reassembles the plurality of wheat packets (e.g., sub-wheat packets) together to form the communication. In some embodiments the wheat packets may have wheat packet identifiers (e.g., sequential characters, or the like) that may be used to reassemble the wheat packets in the proper order. Alternatively, or additionally, the pre-shared key and/or the algorithm may be used to determine the order of the plurality of packets in order to read the communication.

FIG. 3 further illustrates in block 180 that the security system network environment described herein prevents a rogue system that has accessed the network 2 to read any communications made between systems on the network. In some embodiments, the network may be secured to prevent access of systems that are not authorized to access the network 2; however, even if a rogue system was able to access a secured network or if the network 2 was open to any system (e.g., allowed rogue systems to access the network 2 freely or with minimal security) the rogue system would not be able to determine what packets were wheat packets and what packets were chaff packets. That is, since the rogue system does not have the pre-shared key, does not know what algorithm (e.g., pre-shared algorithm), and/or does not what section of the packet was used to create or the signature, the rogue system cannot recreate the signature of each packet to determine what packets are wheat packets and what packets are chaff packets. Theoretically, a rogue system could try to reassembly each of the packets sent and received over the network 2 in order to determine the communication because the packets are sent in clear text, but the shear number of packets being sent through the network 2 between systems and/or within an individual communication would make it impossible for the rogue system to recreate the proper communication. Moreover, even if the rogue system could recreate communications from the plurality of packets (e.g., combinations of the content from combinations of the packets), the rogue system would not know what communication is the correct communication.

The present disclosure provides an improved way for systems to communicate over a network 2 without encrypting the content of the packets being sent for the communication. Moreover, the present disclosure provides an improved way to prevent a rogue system from accessing communications over the network 2. By not having to encrypt each of the communications over the network 2 and in some cases secure the network from rogue systems, the present disclosure improves the processing capacity, the memory, and the processing speeds typically required by the network 2 and systems on the network when the content of each packet for a communication is encrypted. That is, typical encryption processes require more processing capacity and memory, and more processing time to encrypt and decrypt each packet for each communication over a network 2.

It should be understood, that the systems described herein may be configured to establish a communication link (e.g., electronic link, or the like) with each other in order to accomplish the steps of the processes described herein. The link may be an internal link within the same entity (e.g., within the same organization) or a link with the other entity systems. When the systems are not providing data, transforming data, transmitting the data, and/or creating communications, the systems need not be transmitting data over the Internet, although it could be. The systems and associated data for each of the systems may be made continuously available, however, continuously available does not necessarily mean that the systems actually continuously generate data, but that systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format.

Moreover, it should be understood that the process flows described herein include transforming the data from the different systems (e.g., internally or externally) from the data format of the various systems to a data format for display on other systems. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may be converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| To be assigned | SECURE COMMUNICATION FOR REMOTE DEVICES | Concurrently herewith |

-continued

| U.S. patent application Ser. No. | Title | Filed On |
|---|---|---|
| To be assigned | DYNAMIC SEGMENTATION OF NETWORK TRAFFIC BY USE OF PRE-SHARED KEYS | Concurrently herewith |

What is claimed is:

1. A security system for providing secure communications between a plurality of computer systems over a network, the security system comprising:
 a sending system on the network, wherein one or more processing devices of the sending system are configured to execute computer readable code to create a plurality of packets for a communication, and wherein plurality of packets comprise one or more wheat packets and one or more chaff packets;
 a receiving system on the network receives the plurality of packets for the communication, wherein one or more processing devices of the receiving system are configured to execute computer readable code to:
  determine a validated signature for each of the plurality of packets;
  identify the one or more chaff packets when the validated signature determined for each of plurality of packets fails to meet a respective chaff signature for each of the plurality of packets, and discard the one or more chaff packets;
  identify the one or more wheat packets when the validated signature determined for each of the plurality of packets meet a respective wheat signature for each of the plurality of packets; and
  determine the communication from the sending system from the one or more wheat packets;
 wherein a rogue system is prevented from determining the communication from the sending system without identifying the one or more wheat packets or the one or more chaff packets from the plurality of packets.

2. The system of claim 1, wherein determining the validated signature comprises replicating a received signature for each of the plurality of packets, wherein the received signature comprises the chaff signature on each of the one or more chaff packets or the wheat signature on each of the one or more wheat packets.

3. The system of claim 2, wherein the received signature comprises a message authentication code (MAC), and wherein replicating the MAC comprises:
 using a key and an algorithm to create the validated signature.

4. The system of claim 3, wherein the key is a pre-shared key that is shared with each of the plurality of computer systems that are authorized to access the network.

5. The system of claim 3, wherein the algorithm is a pre-shared algorithm that is shared with each of the plurality of computer systems that are authorized to access the network.

6. The system of claim 3, wherein replicating the received signature further comprises:
 using at least a portion of the plurality of packets to create the validated signature.

7. The system of claim 6, wherein the portion of the plurality of packets comprises a serial number for each of the plurality of packets.

8. The system of claim 6, wherein the portion of the plurality of packets comprise content from each of the plurality of packets.

9. The system of claim 1, wherein the sending system creates the wheat signature for the one or more wheat packets.

10. The system of claim 9, wherein the wheat signature is created from a key, an algorithm, and a portion of a wheat packet of the one or more wheat packets.

11. The system of claim 1, wherein the sending system creates the one or more chaff packets using imitation content and imitation signatures.

12. The system of claim 11, wherein the one or more chaff packets appear to be related to a legitimate communication.

13. The system of claim 1, wherein the sending system creates the one or more chaff packets using content and an unrelated validated signature from one or more unrelated legitimate communications.

14. The system of claim 13, wherein the unrelated validated signature is altered before sending each of the one or more chaff packets.

15. A computer implemented method for providing secure communications between a plurality of computer systems over a network, the method comprising:
 creating, by one or more processing devices of a sending system on the network, a plurality of packets for a communication, wherein plurality of packets comprise one or more wheat packets and one or more chaff packets;
 receiving, by one or more processing devices of a receiving system on the network, the plurality of packets for the communication, wherein the one or more processing devices of the receiving system are configured to:
  determine a validated signature for each of the plurality of packets;
  identify the one or more chaff packets when the validated signature determined for each of plurality of packets fails to meet a respective chaff signature for each of the plurality of packets, and discard the one or more chaff packets;
  identify the one or more wheat packets when the validated signature determined for each of the plurality of packets meet a respective wheat signature for each of the plurality of packets; and
  determine the communication from the sending system from the one or more wheat packets;
 wherein a rogue system is prevented from determining the communication from the sending system without identifying the one or more wheat packets or the one or more chaff packets from the plurality of packets.

16. The method of claim 15, wherein determining the validated signature comprises replicating a received signature for each of the plurality of packets, wherein the received signature comprises the chaff signature on each of the one or more chaff packets or the wheat signature on each of the one or more wheat packets.

17. The method of claim 16, wherein the received signature comprises message authentication code (MAC), and wherein replicating the MAC comprises:
 using a key and an algorithm to create the validated signature.

18. The method of claim 17, wherein the key is a pre-shared key that is shared with each of the plurality of computer systems that are authorized to access the network.

19. The method of claim 17, wherein the algorithm is a pre-shared algorithm that is shared with each of the plurality of computer systems that are authorized to access the network.

20. A computer program product for providing secure communications between a plurality of computer systems over a network, the computer program product comprising at least one non-transitory computer-readable medium having computer-readable program code portions embodied therein, the computer-readable program code portions comprising:

an executable portion configured to allow a sending system to create a plurality of packets for a communication, and wherein plurality of packets comprise one or more wheat packets and one or more chaff packets;

an executable portion configured to allow a receiving system on the network to receive the plurality of packets for the communication, wherein an executable portion configured to:

determine a validated signature for each of the plurality of packets;

identify the one or more chaff packets when the validated signature determined for each of plurality of packets fails to meet a respective chaff signature for each of the plurality of packets, and discard the one or more chaff packets;

identify the one or more wheat packets when the validated signature determined for each of the plurality of packets meet a respective wheat signature for each of the plurality of packets; and determine the communication from the sending system from the one or more wheat packets;

wherein a rogue system is prevented from determining the communication from the sending system without identifying the one or more wheat packets or the one or more chaff packets from the plurality of packets.

* * * * *